Figure 1:
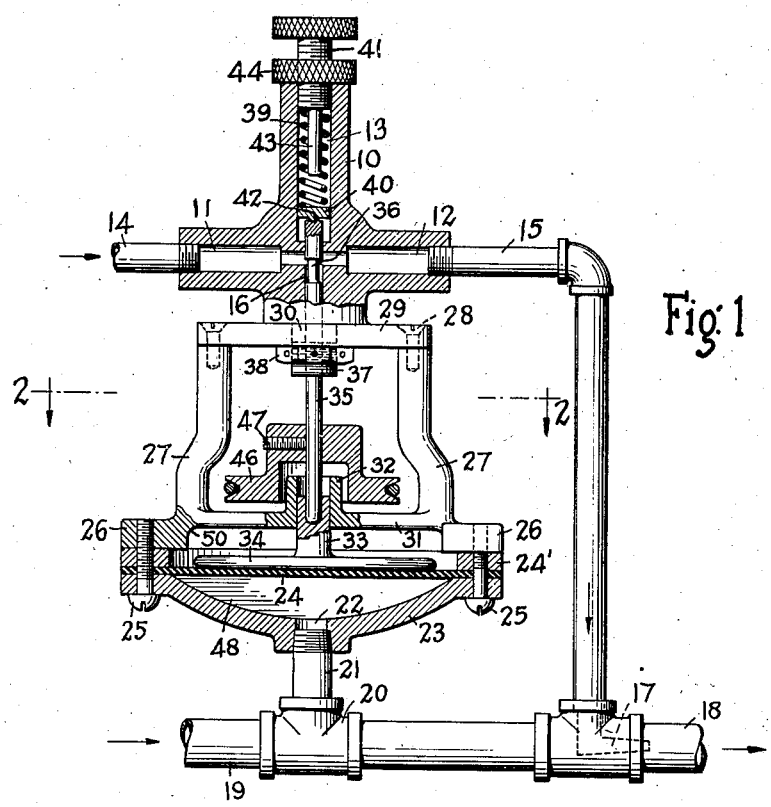

April 8, 1930.  M. MERKER  1,753,662

DIAPHRAGM VALVE

Filed Sept. 13, 1928

INVENTOR
Max Merker
BY
Harry Jacobson
ATTORNEY

Patented Apr. 8, 1930

1,753,662

UNITED STATES PATENT OFFICE

MAX MERKER, OF NEW YORK, N. Y.

DIAPHRAGM VALVE

Application filed September 13, 1928. Serial No. 305,850.

This invention relates to automatic valves and is particularly applicable to pressure operated diaphragm valves wherein the proportions of the various gases, vapors, liquids or combinations thereof which are allowed to pass into an outlet are controlled through the pressure on the diaphragm. Considerable trouble has been experienced with regulating valves of this type by reason of the sticking of the valve stem caused, for instance, by the congealment of oils about the stem, or to deposits or accumulations of foreign matter, and by reason of the inefficient operation of the diaphragm in regulating or shutting off the supply of material passing through the valve, and of the complete or partial closure of the valve passages by accumulated matter.

My invention contemplates the provision of a valve for effectively regulating the flow of water, steam, air, fuel-oils and other liquids, gases and vapors automatically under all conditions of use no matter how severe, by compensating for changes in pressure, whereby the proportions of the various materials fed are maintained and constant flow of material is effectively cut off when the pressure on the diaphragm is removed. My improved construction includes a valve stem arranged to rotate for preventing the sticking thereof and for keeping the valve passages free and open and adjusting means for determining the proportions of the materials allowed to pass the valve.

Figure 2:
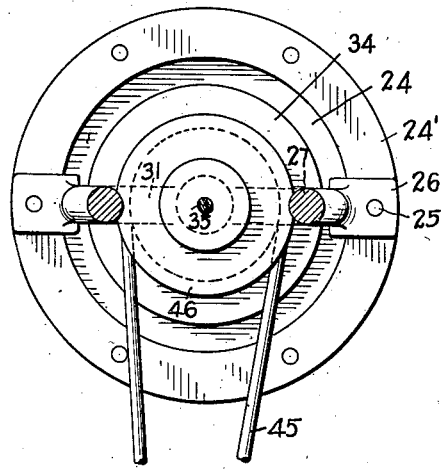

The various objects of my invention will be clear from the description which follows and from the drawings, in which, Fig. 1 is a front view and partial vertical section of my improved valve, and Fig. 2 is a horizontal section of the same taken on the line 2—2 of Fig. 1.

In the practical embodiment of my invention, the valve body 10 is provided with an inlet opening 11 and an outlet opening 12 preferably in alignment with the inlet opening. A compartment 13 in the valve body serves to receive the accurate adjusting means soon to be described and is preferably arranged substantially at right angles to the openings 10 and 11 which are separated by and communicate through a cylindrical opening 16 through which the valve stem is passed. Into the inlet opening is threaded a suitable inlet pipe as 14, the outlet pipe 15 being connected to the outlet opening 12. Material which will be referred to hereinafter as oil without limitation thereto is delivered to the inlet pipe and passes through the inlet opening 11 and when allowed to do so, passes into the passage 16 and thence through the outlet opening 12. The material then passes through the pipe 15 and out through a suitable nozzle 17 into the main outlet pipe 18. The second type of material which will be referred to hereinafter as air without limitation thereto enters the feed pipe 19 under proper pressure and passes therethrough into the main outlet pipe 18. The stream of air serves to carry the oil with it and into the main pipe 18 where the air and oil are thoroughly mixed. A T as 20 is inserted into the feed pipe 19, the pipe 21 being connected to one branch of said T and being suitably threaded into the opening 22 of the diaphragm frame 23. The diaphragm 24 of flexible material of the usual type, such as rubber, is suitably secured between the diaphragm frame 23 and the diaphragm ring 24' with a leak-proof joint therebetween as by means of the screws 25, said screws passing through the ring into suitable lugs 26 extending outwardly from the frame arms 27. Suitable screws as 28 connect the frame head 29 which extends from the valve body 10 to one of the ends of each of the frame arms 27, said plate being suitably perforated as at 30 to allow the passage therethrough of the valve stem 35 and of the adjusting screw 37 secured thereto. The cross-bar 31 connects the frame arms 27 and is provided with a suitable bearing 32 in which the hub 33 of the diaphragm disc 34 is suitably mounted for axial movement.

I prefer to so mount the disc 34 that the hub 33 thereof may rotate in the bearing 32 though it will be understood that if the disc 34 is not to rotate as is sometimes desirable, a suitable key allowing only axial movement of said disc may connect the hub 33 and the bearing therefor in a manner well known.

A suitable seat as 50 is provided on the diaphragm side of the cross-bar 31 which seat the disc 34 engages in the limiting position thereof, that is, when the greatest pressure is put on the diaphragm, whereby undue movement of the valve disc is prevented. The valve stem 35 is suitably connected at one end thereof to the disc hub 33 so that axial movement of said disc causes similar movement of the stem. Near the other end of said stem is the reduced portion 36 which is designed to be arranged in the opening 16 during the operation of the valve so as to provide an annular valve passage through which the oil may pass. Secured to the stem near the middle thereof is the screw 37 on which is mounted the adjusting nut 38. Said nut serves to limit the axial opening movement of the stem 35 under pressure on the diaphragm by reason of the engagement of said nut with the face of the frame head 29, and serves further to adjust approximately the amount of the exposure of the reduced portion 36 of the stem in the valve opening 16, and the length of the annular valve passage whereby the maximum quantity of material fed through the opening 16 is predetermined as desired.

For further adjusting the position of the valve stem more accurately, and for locking said stem in its adjusted position, I provide the compression spring 39 arranged in the compartment 13 of the valve body and pressing against a washer 40 at one end thereof and against one end of the screw 41 at the other end thereof.

The washer 40 is preferably formed with a hemi-spherical projection 42 at the center thereof engaging a similarly shaped depression in the end of the valve stem for transmitting the pressure of the spring 39 to the center or axis of the stem at all times and in all relative positions of the stem and washer. The screw 41 is provided with elongated projection 43 entering the interior of the spring 39 and serving as a guide for said spring. A lock-nut 44 is mounted on the threaded portion of the screw 41 and by engagement with the extremity of the valve body 10 serves to lock the adjusting screw in its adjusted position against displacement accidentally or otherwise, until said lock-nut is first loosened.

In order to prevent sticking of the valve stem, and of the valve disc 34 against the diaphragm 24, said valve stem is constantly rotated during operation of the valve by means of the belt 45 operating on the pulley 46, which pulley is suitably secured to the valve stem as by means of the set screw 47. As has been previously pointed out, the valve disc 34 is so mounted on the stem as to rotate therewith, though if desired, the disc and stem may be so secured together so that only axial movement is transmitted one to the other.

It will be understood that when no air enters the pipe 19, the valve should be shut off so as to prevent the passage of any oil through the valve passage. This is accomplished by means of the spring 39, which normally forces the valve disc against the diaphragm and consequently moves the stem so that the constricted portion 36 thereof is completely past the opening 16 and said opening is completely obstructed and no oil can pass the stem. As soon, however, as the air is forced into the pipe 19, the pressure of the air passing through the T 20 and the pipe 21 into the diaphragm chamber 48 and acting upon the diaphragm 24, forces said diaphragm out against the valve disc and moves said disc together with the stem connected thereto axially against the action of the spring 39 so that the desired amount of the constricted portion 36 is arranged in the valve opening 16 and the proper amount of oil, proportionate to the air pressure, and entering the pipe 14 is allowed to pass into the pipe 15. Should the air pressure in the pipe 19 be reduced, the diaphragm under the reduced pressure, flexes back towards its initial position and allows the spring 39 to move the valve stem so as to present an annular valve passage of less length than before, thereby reducing the amount of oil flowing through said passage proportionately so that the mixture in the pipe 18 maintains its original proportions.

My improved valve is particularly adapted for the mixing of oil and air for oil burning devices, though it will be readily seen that other materials may be mixed in accurate predetermined proportions by means of my improved device provided that one of the materials is fed under pressure. For instance, steam and water may be mixed to maintain the water passing into the outlet pipe 18 at a constant predetermined temperature. In that case, the water would be fed to the pipe 19 and the steam to the pipe 14, the nut 38 and the screw 41 being adjusted to provide the proper length of the annular valve passage to supply steam in proper proportion to the water supply, and in predetermined volumes. Should the water pressure increase, with the consequent additional supply of water, the diaphragm 24 is operated under the increased pressure to move the valve disc, and therethrough the valve stem thereby increasing the effective size of the opening 16 with the consequent admission of an increased supply of steam. The various parts of my device may be so proportioned as to maintain a given volume of steam supply to a given volume of water. Similarly, other materials may be mixed, such as raw water and liquid lime for the purpose of reducing the acidity of the water. In that case, the water enters the diaphragm chamber and the lime enters the valve chamber, the supply of lime being controlled automatically by the water pressure as above described.

It will be seen that my improved valve is at all times free and unhampered to serve its main purpose of regulating the size of the valve passage by reason of the rotation of the valve stem, and that deposits cannot accumulate about said stem because of the constant agitation nor can the diaphragm disc adhere to the diaphragm when said disc is caused to rotate. It will further be seen that the size of the valve passage can be accurately adjusted so as to supply a constant proportion of different materials to the outlet pipe.

Other uses and applications of my improved valve are contemplated and need not be stated herein in detail. It is also contemplated that various changes may be made in the structure shown and described and I do not therefore wish to be understood as limiting myself to the specific structure mentioned but intend to avail myself of the full range of equivalents afforded by and falling within the scope of the appended claims.

I claim:

1. The combination with a valve body having a valve passage therein, of a valve stem extending through said passage, a portion of reduced diameter on said stem adapted to vary the effective size of said passage, a diaphragm disc at one end of the stem, a spring at the other end of the stem exerting pressure toward said disc, a pressure diaphragm adapted to move said disc and said stem axially against the action of said spring, and means for rotating said stem.

2. In a valve having a valve passage therein, a stem crossing said passage, a portion of reduced diameter on said stem intermediate of the ends thereof, fluid pressure operated means including a non-rotatable diaphragm for automatically shifting said stem axially for varying the length of the reduced portion arranged at said passage on the variation of the pressure on said means, and means for rotating said stem for preventing sticking thereof.

3. In a valve having a valve passage therein, a revoluble valve stem adapted to control the passage of material through the valve passage, a pulley on said stem and intermediate the ends thereof for continuously rotating said stem, while the valve is operative to prevent sticking of the stem, and fluid pressure operated means for automatically shifting said stem for varying the effective size of said passage in direct ratio to the pressure on said means.

4. In a valve having a valve passage therein, a valve stem, means for continuously rotating said stem a portion of reduced diameter on said stem adapted during operation to be arranged at said passage, and means operatively connected to said stem for automatically controlling the amount of material passing through said valve including a non-rotatable diaphragm, a bearing member for one end of the stem operated by the diaphragm and a pressure conduit communicating with one side of the diaphragm and with the outlet side of the valve passage.

5. In a valve having a valve passage therein, a spring-pressed valve stem controlling the effective size of said passage, means for adjusting said stem for fixing the maximum effective size of said passage, pressure operated means for automatically shifting said stem for varying the effective size of said passage in direct ratio to the pressure on said means including a diaphragm, and a pressure conduit communicating with the diaphragm and with the valve passage, and means independent of the stem adjusting means for continuously rotating the stem.

6. In a valve having a valve passage therein, a revoluble valve stem extending through said passage, a portion of reduced diameter on said stem intermediate the ends thereof adapted to control the effective size of said passage, means for adjusting said stem for fixing the maximum effective size of said passage, a diaphragm disc at and serving as a bearing for, one end of said stem, a spring at the other end of said stem exerting pressure on the stem toward said disc, means for adjusting said spring and a pressure diaphragm adapted to move said disc and said stem axially against the action of said spring for varying the effective size of said passage in direct ratio to the pressure on the diaphragm.

7. In a valve having a valve passage therein for one type of material, a valve stem extending through said passage, a portion of reduced diameter on said stem adapted to control the effective size of said passage, means for adjusting approximately the maximum amount of said portion presented in said passage, means for accurately adjusting said amount comprising a threaded screw on said valve body and a spring interposed between said screw and the end of said stem, and means for controlling the normal effectual size of said passage including a diaphragm acting upon said stem, and a pressure conduit communicating with the diaphragm and with the outlet side of the valve passage.

8. In a valve having a valve passage therein, a valve stem extending through said passage, a portion of reduced diameter on said stem adapted to control the effective size of said passage, fluid pressure means for moving said stem axially, means for adjusting said stem axially and for limiting the adjusted axial movement of said stem, means for limiting the total axial movement of said stem, and means independent of the adjusting means for continuously rotating the stem.

9. In a diaphragm valve, a valve stem, a pressure operated diaphragm operatively connected to said stem for axially moving said stem, a frame for supporting said diaphragm, means on said frame for limiting the total axial movement of said stem in one direction, means for predetermining the allowable amount of said movement in the same direction, and means for continuously rotating said stem.

10. In a diaphragm valve, having a valve passage therein, a continuously revoluble stem, means operatively connected to said stem and dependent upon the pressure on the diaphragm of said valve, for causing said stem to vary the effective size of said valve passage and adjusting means for predetermining the maximum effective size of said passage.

11. In a valve, having a valve passage therein, a valve stem, a non-rotatable diaphragm operating said stem to vary the effective size of the passage, a pulley on said stem and means for rotating said pulley.

12. In a diaphragm valve, a valve stem, a spring at one end of said stem, a diaphragm disc at the other end of said stem and means for rotating said stem for preventing sticking thereof.

13. In a valve, a valve body having a valve passage therein, a stem crossing said passage, means for adjusting said stem to a predetermined limiting position, comprising a screw on said stem intermediate of the ends thereof, an adjusting nut on said screw adapted to move said stem longitudinally relatively to said valve body, a spring in said valve body exerting pressure upon one end of said stem, a screw confining said spring in said body and in threaded engagement with said body and a nut for locking said screw in adjusted position.

14. In a diaphragm valve, a valve body having a valve passage therethrough, an outlet pipe communicating with said passage, a valve stem arranged in said body and passing through said passage, a diaphragm disc at one end of said stem, adjusting means for said stem at the other end thereof, a diaphragm body, a flexible diaphragm in said body adapted to be engaged by said disc, a frame connecting said valve body and said diaphragm body, adjusting means on said stem between said frame and said disc adapted to engage said frame in the limiting position of said stem, a pipe for material under pressure communicating with said outlet pipe, and a by-pass in the pressure pipe leading to said diaphragm body.

15. In a diaphragm valve, a valve body having a valve passage therethrough, a revoluble valve stem arranged substantially perpendicularly to and passing through said valve passage, a diaphragm body having a pressure inlet therein, a diaphragm in the diaphragm body operatively connected to said stem for moving said stem longitudinally, a nozzle communicating with said valve passage and a pipe connected to the inlet in said diaphragm body and surrounding said nozzle whereby the material under pressure passing through said pipe carries materials out of said nozzle.

16. In a diaphragm valve, a valve stem, means for rotating said stem for preventing sticking thereof, and independent fluid pressure operated means for adjusting said stem longitudinally, in response to the pressure on the valve diaphragm.

17. In a diaphragm valve, a valve stem, means for rotating said stem, manually operable means independent of the stem rotating means for adjusting said stem longitudinally, and means for automatically adjusting said stem longitudinally on the variation of the pressure on the diaphragm of the valve.

18. In a diaphragm valve, a valve stem, means for rotating said stem for preventing sticking thereof, said means being ineffective to adjust the stem, and fluid pressure operated means for automatically adjusting said stem longitudinally, in response to the pressure on the valve diaphragm.

MAX MERKER.